United States Patent [19]

Maier

[11] 4,353,623

[45] Oct. 12, 1982

[54] LEADTHROUGH FOR ELECTRIC CONDUCTORS

[75] Inventor: Hermann F. L. Maier, Hamburg, Fed. Rep. of Germany

[73] Assignee: U.S. Philips Corporation, New York, N.Y.

[21] Appl. No.: 158,659

[22] Filed: Jun. 11, 1980

[51] Int. Cl.[3] .................. G02F 1/07; B32B 31/00; H01B 17/26
[52] U.S. Cl. ................... 350/391; 156/293; 156/305; 174/50.62; 174/152 GM
[58] Field of Search ............... 350/391–392, 350/343; 174/50.61–50.62, 152 GM; 313/266, 317–318, 285, 289–290; 428/422; 429/178, 181–184; 156/293, 305; 403/179, 270, 404

[56] References Cited

U.S. PATENT DOCUMENTS

| 500,670 | 7/1893 | Nickerson et al. | 174/50.62 |
| 503,671 | 8/1893 | Nickerson | 313/317 |
| 3,874,929 | 4/1975 | Greatbatch | 429/181 |

*Primary Examiner*—William H. Punter
*Attorney, Agent, or Firm*—Paul R. Miller

[57] ABSTRACT

While avoiding the quartz fusion technique, an accurate and vacuum-tight electric leadthrough is provided which in addition is mechanically rigid. The electric conductor is fixed at the interior of a cell through an aperture by means of a ring of polytetrafluoroethylene in such a manner that the conductor is held in the center of the aperture. Over the ring and inside the aperture, a layer of cyano acrylate talcum cement is provided. Inside this layer in the aperture, a layer of a granular filler which is soaked with cyano acrylate adhesive is provided. Finally, the outermost part of the aperture is filled and sealed with a layer of cyano acrylate talcum cement.

2 Claims, 2 Drawing Figures

LEADTHROUGH FOR ELECTRIC CONDUCTORS

The invention relates to a leadthrough for electric conductors through glass walls or quartz glass walls, in particular for electrode connections in Kerr cells.

In the manufacture of digital light deflectors composed of Kerr cells, high precision requirements are imposed so that the methods used are very cumbersome and expensive.

Light deflectors are manufactured predominantly in quartz fusion technique. However, temperatures of nearly 1000° C. which are necessary in the assembly make it difficult to maintain tolerances in the $\mu$m range. Moreover, there is a very high reject percentage already during the manufacture. Due to their sensitivity to shocks and the tensile stresses still present in the glass, the finished cells also do not show at all the required life of at least 2 years.

It is stated in German patent specification No. 964,152 that metallic leadthroughs, for example in the form of bolts or pipes, are provided in a gas-tight and water-tight manner in containers or walls of an insulating material, for example ceramic, glass or a synthetic resin, in that the leadthroughs are embedded directly in the material in question, while in metallic containers or walls the leadthroughs must be provided so as to be insulated. German patent specification No. 964,152 therefore describes a method by which a metal wall is provided with an electrically insulating leadthrough which is oil tight and gas tight. However, the insulation is a problem which does not occur in leadthroughs of the kind mentioned in the opening paragraph. In these leadthroughs on the contrary the above-described difficulties occur which result from the quartz fusion technique.

In the method according to the German patent specification No. 964,152 a metallic leadthrough bolt is used which is rigidly connected to a centering member consisting of an insulating material. The centering member comprises an angular projection. The centering member is provided on the metal wall in such manner that the projection extends into a bore of corresponding diameter provided in the metal wall. Cup-shaped moulds are then provided in the lead-through place on either side of the metal wall. The moulds and all the cavities present inside the moulds are filled with a moulding resin which without splitting off volatile components polymerizes to form a moulded body which will no longer soften. Apart from the fact that, as already said, the problem of the insulation is to be solved by means of this method, the method cannot be used in the manufacture of leadthroughs of the kind mentioned in the opening paragraph already because the finished leadthrough may not project from the wall. The disadvantageous results of such a projection will be described in detail hereinafter.

An electric insulating member constructed from layers is known from German Auslegeschrift 10 45 499 which insulates, for example, a conductor from a housing. The insulating member consists of layers of a moulding resin filled with fillers, the type or quantity of filler differing from layer to layer. According to German Auslegeschrift 12 67 737 electric apparatus, for example transformers and choke coils, are impregnated with a curable moulding resin in moulds or housings in one operation and are embedded while the space between the electric apparatus and a winding and the wall of the housing or mould is filled with a filler and then filled with pure moulding resin. In these two Auslegeschriften insulation problems are also created.

German Auslegeschrift 23 56 237 published Feb. 24, 1977 and corresponding to German Offenlegungsschrift published May 28, 1975 discloses the use of a paste consisting of cyano acrylate and talcum for the manufacture of a vacuum-tight bonded joint for glasses which will come in contact with an aggressive liquid, in particular for digital light deflectors the housing of which consists of quartz glass and which are filled with an aggressive liquid, for example nitrobenzene. However, bonded joints cannot be compared to leadthroughs because in this case quite different thickness ratios are present. During the investigations which have led to the invention it was therefore established that it is not possible as such to apply this bonding technique to the manufacture of leadthroughs for electrode connections of Kerr cells, because only a small rigidity can be achieved with cyano acrylate talcum cement which cannot withstand the mechanical loads. On the other hand, there was no reason to resort to the above explained leadthroughs because with such leadthroughs insulation problems have to be solved which do not exist in Kerr cells.

It is the object of the invention to provide an accurate and vacuum-tight electric leadthrough which in addition is mechanically rigid, while avoiding the quartz fusion technique.

According to the invention this object is achieved in that the electric conductor is fixed in the lower part of an aperture through the wall facing the interior of the cell by means of a ring of polytetrafluoroethylene in such manner that the conductor is held in the center of the aperture, that a layer of cyano acrylate talcum cement is provided over the ring inside the aperture, that a layer of a granular filler soaked with cyano acrylate adhesive is present above the layer in the blind hole thus formed, and that the uppermost part of the aperture directed outwards is filled and sealed with a layer of cyano acrylate talcum cement.

The layer of the granular filler which is soaked with cyano acrylate adhesive is preferably built up from several sub-layers.

The invention has the advantage that the mechanical rigidity of the leadthrough has a much higher stability than the housing of the Kerr cell consisting of glass parts, as has been demonstrated by forced tensile tests.

It has already been stated above that the lead-through of the kind mentioned in the opening paragraph and hence also the leadthrough according to the invention may not project from the wall. This would in fact have for its result that the plug of adhesive formed from the cyano acrylate-containing layers would not be protected from the agressive liquid in the interior of the cell by the ring of polytetrafluoroethylene.

An embodiment of the invention is shown in the drawing and will be described in detail hereinafter.

Figure 1:
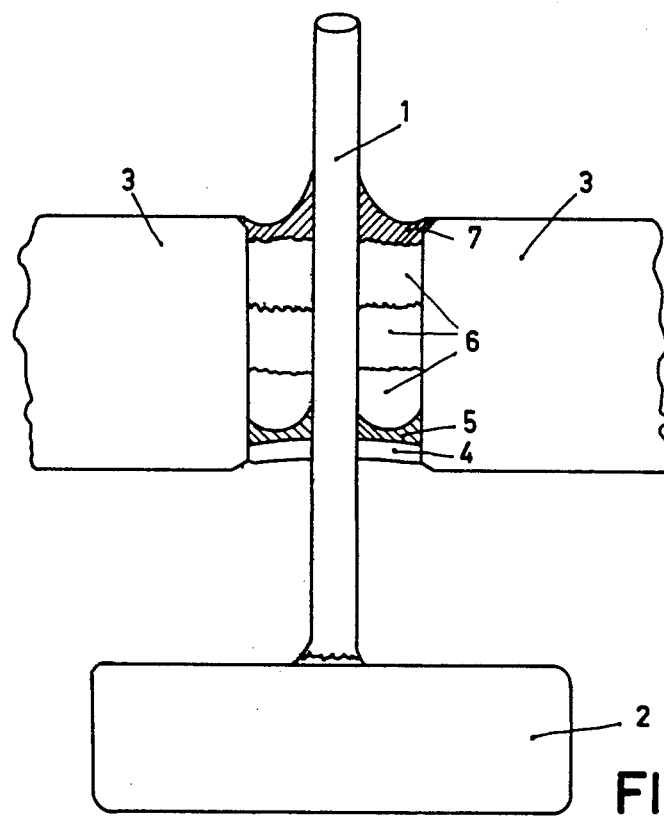
FIG. 1 is a diagrammatic sectional view of a leadthrough.

In FIG. 1 an electric conductor 1, for example, a tungsten pin, supports an electrode 2. The tungsten pin is passed through an aperture through a quartz glass wall 3. The aperture is filled with the following layers from the bottom to the top: an annular disk 4 of PTFE, a layer 5 of cyano acrylate-talcum cement, several layers 6 of a granular filler which is soaked with cyano acrylate adhesive, and a layer 7 of cyano acrylate-talcum cement.

A disk of polytetrafluoroethylene (PTFE) is selected as the lowermost layer 4, because this material is fully inert with respect to nitrobenzene. It serves to position the electric conductors, for example tungsten pins, and serves as a screening for the adhesive cement. However, it is not a one hundred percent seal and it is already sufficient not to let the not yet set adhesive ooze through.

The overlying layer 5 consists of a layer of cyano acrylate-talcum cement which forms the nitro benzene-tight seal of the leadthrough. Since pure cyano acrylate monomer does not cure like a cement, a filler is added. A monomer of, for example, 120 cP/25° C. viscosity is selected to form together with the filler a thin liquid mixture which in the cured condition shows the most favourable flexible hardness. The same hardness would also be obtained with any other commercially available monomer of, for example, 1500 cP/25° C. viscosity, but this is unfavourable in use.

Talcum is chosen as a filler due to its properties favourably influencing the elasticity, adhesion, armouring and cohesion. Moreover, a mixture ;with 30% by volume of cyano acrylate monomer provides a useful pot life of 3 to 6 minutes at 40% relative air humidity. The pot life can be shortened with more filler and be extended with less filler. An increased air humidity causes the surface of the mixture to set more rapidly. Other fillers which might be considered have too long or too short pot lives with corresponding mechanical disadvantages. For example, the mixture with quartz fluor is too brittle and has too strong a shrinkage.

Fillers having similarly good properties as talcum are plastorite, muscovite with grown quartz, mica, chloride and quartz. However, with these fillers the pot lives are too short and the flexibility as with talcum is not obtained either.

Figure 2:
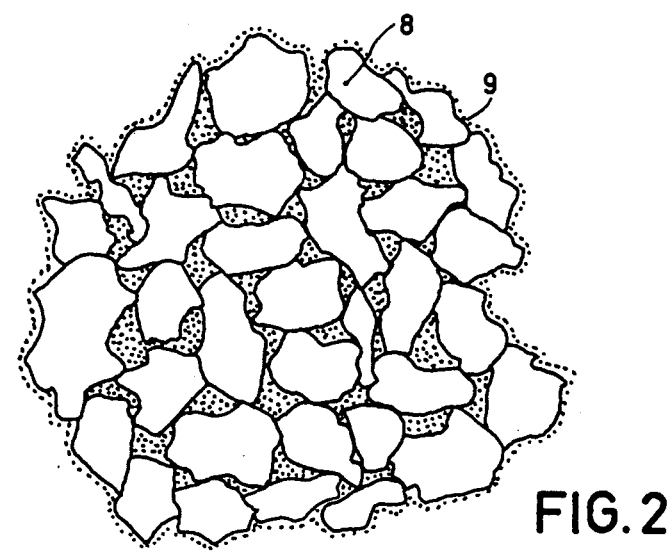
FIG. 2 shows the structure of the granular filler which is contained in the layer soaked with cyano acrylate.

The next layer 6 is a kind of plug which ensures the mechanical hold of the leadthrough pins and consists of a hard, solid and porous mass. FIG. 2 shows on an enlarged scale how its structure is built up in principle. In order to satisfy all requirements, it must consist of grains 8 which are held together by their sharp coarse projections. The many small grains 9 stick to the surface of the larger ones and make them rough in particular in those places where they contact each other, so that movement is not easily possible. This is necessary to compensate for the cohesion forces of the adhesive.

Many mixtures of a variety of grain sizes produce useful results. A tested and approved composition is mentioned as an example for a given leadthrough size. In this case the leadthrough pin has a diameter of 1.2 mm and the hole has a diameter of 4 mm. The cell wall is 6 mm thick. For the desired hardness was used 60% by volume of fine quartz splinters (grain size 0.1 mm), 20% by volume of plastorite 0.5; 10% by volume of plastorite 0 and 10% by volume of plastorite 00. Plastorite is a commercially available 3-components special product for the paint, lacquer and plastics industry. It is described in leaflets of Messrs. Naintsch. Such a mixture is very loose and easily absorbs the liquid adhesive. In order to achieve an optimum drawing-in of the adhesive, a monomer with very low viscosity is selected which penetrates to a depth of several millimeters due to its high capillary properties.

First the PTFE and the adhesive cement seal are provided. In the blind hole thus formed the mixture of grains is provided. With a height of 4 mm the upper layer of grains would already be sealed after adding the adhesive before all the air has escaped.

In order to avoid this difficulty and without using a cumbersome vacuum adhesion method, the plug is constructed in three layers of each 1.5 mm. As a result of this it is ensured that no air is enclosed. Each process lasts approximately 5 minutes.

As an additional protection a fourth layer 7 consisting of cyano acrylate-talcum cement is provided.

The PTFE disk 4 used as a centering member is not rigidly connected to the leadthrough pin 1 since the electrode 2 soldered to the leadthrough pin after centering has still to be adjusted axially and for rotation.

The centering disk 4 is first pressed into the aperture until a blind hole which is as deep as possible is formed for the adhesive plug 6. The leadthrough pin 1 is then passed through and the electrode 2 is adjusted in a device for distance and rotation. The PTFE disk centers the pin but is no seal and is mechanically not stable.

The cyano acrylate-talcum cement produces a vacuum-tight seal but mechanically cannot be loaded and as a thick plug would buckle the pin due to shrinkage by drying.

The cyano acrylate filler plug produces the mechanical stability but in itself is not vacuum-tight.

What is claimed is:

1. A leadthrough for electric conductors through glass walls or quartz glass walls, in particular for electrode connections in Kerr cells, characterized in that the electric conductor (1) is fixed in the lower part of an aperture through the wall (3) facing the interior of the cell by means of a ring (4) of polytetrafluoroethylene in such manner that the conductor is held in the center of the aperture, that a layer (5) of cyano acrylate talcum cement is provided over the ring inside the aperture, that a layer (6) of a granular filler soaked with cyano acrylate adhesive is present above said layer in the blind hole thus formed, and that the uppermost part of the aperture directed outwards is filled and sealed with a layer (7) of cyano acrylate talcum cement.

2. A leadthrough as claimed in claim 1, characterized in that the layer (6) of the granular filler which is soaked with cyano acrylate adhesive is built up from several sub-layers.

* * * * *